United States Patent [19]

Lunn

[11] Patent Number: 5,020,635
[45] Date of Patent: Jun. 4, 1991

[54] ROTARY SHAFT AND LUBRICATING SYSTEM THEREFOR

[75] Inventor: Garfield R. Lunn, Amherstburg, Canada

[73] Assignee: Arvid Machine Tools Ltd., Windsor, Canada

[21] Appl. No.: 426,712

[22] Filed: Oct. 26, 1989

[51] Int. Cl.$^5$ .......................................... F01M 11/00
[52] U.S. Cl. .................. 184/6.18; 184/6.12; 184/6.14; 384/398
[58] Field of Search ............... 184/6.18, 6.14, 6.12; 384/606, 613, 398; 464/7

[56] References Cited

U.S. PATENT DOCUMENTS

| | | | |
|---|---|---|---|
| 712,602 | 11/1902 | Schaum | 184/6.18 |
| 1,157,644 | 10/1915 | London . | |
| 1,186,195 | 6/1916 | Honegger | 384/606 |
| 1,822,573 | 9/1931 | Gerald et al. | 184/6.18 |
| 4,037,890 | 7/1977 | Kurita et al. | 308/187 |
| 4,280,338 | 7/1981 | Shannon et al. | 64/2 R |
| 4,344,507 | 8/1982 | Osborne | 184/6.14 |
| 4,383,577 | 5/1983 | Pruitt | 166/95 |

FOREIGN PATENT DOCUMENTS 0338209 6/1959 Switzerland ...................... 184/6.18

Primary Examiner—Ira S. Lazarus
Assistant Examiner—Alan B. Cariaso
Attorney, Agent, or Firm—Burns, Doane, Swecker & Mathis

[57] ABSTRACT

A tool shaft is supported for rotation about a vertical axis by means of upper and lower bearings. A motor drives the shaft at least at 500 rpm. A gap is formed radially between the shaft and an adjacent stationary member, the gap extending from one bearing to the other. A reservoir which contains lubricating oil communicates with the gap to supply oil thereto to cool and lubricate. The tool shaft carries a helical thread disposed within the gap which pumps the oil upwardly through the gap and through the bearings to create a hydrostatic bearing for the shaft segment extending between the bearings. The tool shaft is driven by a gear shaft which also is provided with a hydrostatic support by means of oil pumped through a radial gap by means of helical threads which are stationary, but which are disposed closely adjacent a surface of the gear shaft.

12 Claims, 1 Drawing Sheet

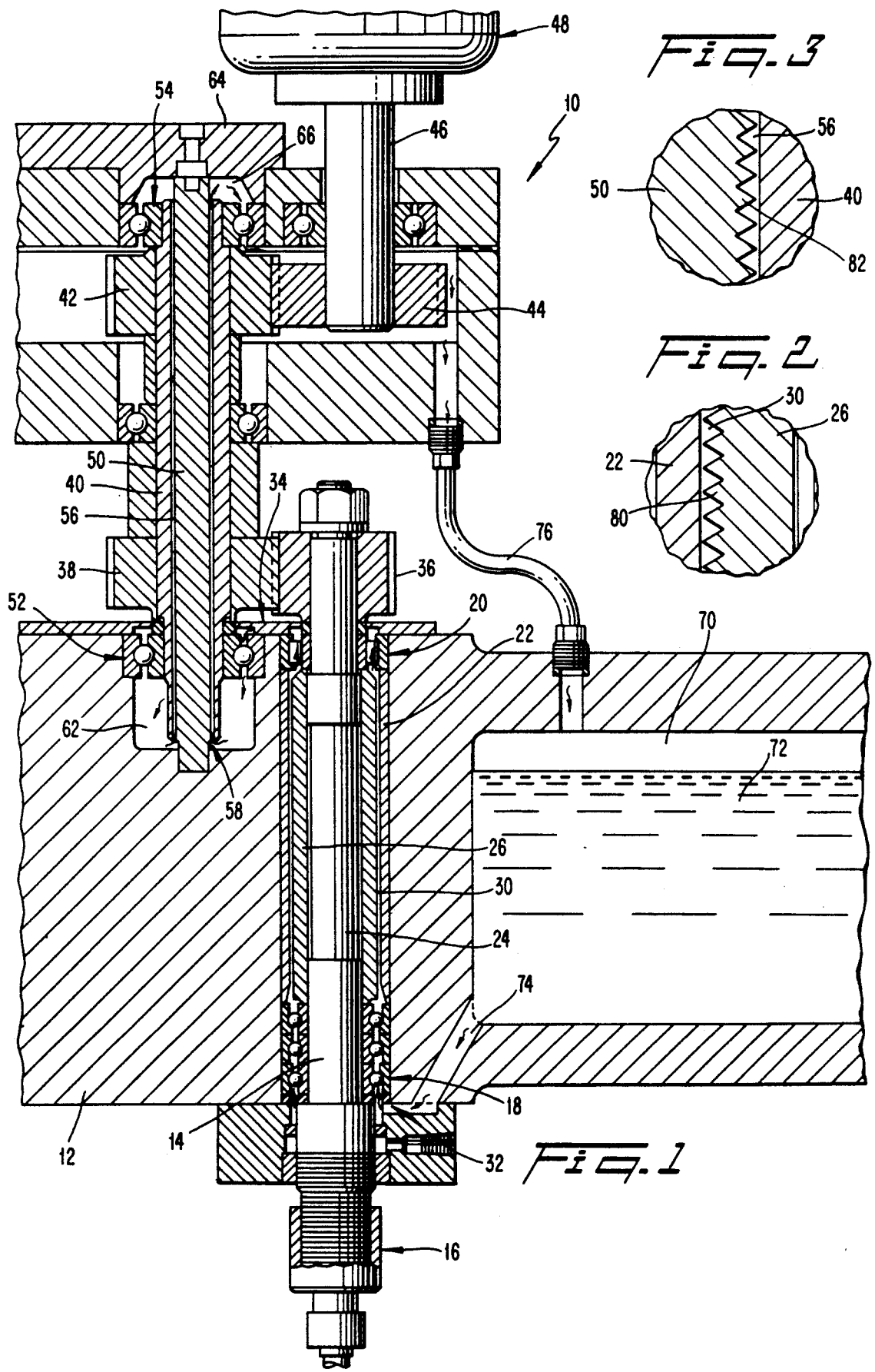

ROTARY SHAFT AND LUBRICATING SYSTEM THEREFOR

BACKGROUND OF THE INVENTION

The present invention relates to the lubrication of high speed vertical shafts, such as vertical drill spindles.

Drills for drilling holes in workpieces, such as metal workpieces, are conventionally mounted on a movable carriage or deck so as to be capable of movement toward and away from the workpiece. Rotatably carried by the carriage is a shaft to the front end of which a drill bit is fastened. The spindle is driven at a relatively high speed, i.e., upwards of 500 rpm, by suitable gearing. Upper and lower ends of the shaft are rotatably mounted by bearings, e.g., a ball bearing at the lower end and a roller bearing at the upper end.

In order to cool the shaft and cool and lubricate the bearings during a drilling operation, it is conventional to conduct a continuous flow of lubricating oil vertically along the outer periphery of the shaft from one bearing to another. This cooling function is necessary to prevent excessive thermal expansion of the shaft and bearings. The shaft is mounted within the bore of a vertical stationary sleeve, wherein an annular gap formed between the outer periphery of the shaft and the inner wall of the bore forms a vertical channel for the oil.

The oil is supplied from a reservoir by a pump which introduces the oil into the top of the oil channel whereupon the oil circulates through the upper bearing, downwardly through the channel, through the lower bearing, and then back to the reservoir.

The shortcomings of such a lubricating system, aside from the expense of having to provide a pump, include the need to provide a separate monitor to indicate that the pump is functioning to pump oil. In the absence of such a monitor there would occur a risk that the shaft and bearings could become overheated and damaged if the pump malfunctioned. Furthermore, the frictionally meshing toothed wheels of the pump become hot due to frictional contact and thus impart heat to the oil. This heating of the oil diminishes the ability of the oil to cool the shaft and bearings.

Another type of lubricating system has been proposed which involves spraying a mist of lubricating oil into each bearing. However, such a system is expensive, and the oil mist does no always adequately cool the spindle and bearings.

A further problem which may be encountered in connection with relatively rapidly rotating shafts (e.g., shafts rotating at least at 500 rpm) relates to a tendency for the shaft to vibrate. The unsupported segment of the shaft extending between the bearings is substantially longer than the combined segments of the shaft supported within the bearings. If the load applied to the shaft during drilling results in the unsupported segment becoming bent (i.e., becoming non-symmetrical about the axis of rotation), vibration of the shaft will occur due to the high speed of rotation. Neither of the aforementioned lubricating systems can appreciably reduce such vibration.

SUMMARY OF THE INVENTION

The above-discussed problems are eliminated or at least alleviated by the present invention which relates to an apparatus comprising a stationary member, and a shaft mounted for rotation relative to the stationary member about a vertical axis. Vertically spaced bearings support the shaft for rotation about the axis. A segment of the shaft extending between the bearings is substantially longer than an outer diameter of the shaft. A gap is formed radially between opposing annular surfaces of the shaft and the stationary member. A length of the gap extending between the bearings is substantially greater than the gap width. A lubricant inlet communicates with the gap adjacent one vertical end thereof. A lubricant outlet communicates with the gap adjacent an opposite vertical end thereof. The gap and the lubricant inlet and outlet define portions of a lubricant conduit in which the bearings lie. A reservoir is provided having an outlet communicating with the lubricant inlet and containing a supply of lubricant oil. A drive mechanism is operably connected to the shaft for rotating the shaft at least at 500 rpm. One of the opposing annular surfaces includes a helical thread for inducing a vertical flow of lubricant oil through the lubricant conduit for lubricating the bearings and creating hydrostatic support for a segment of the shaft extending between the bearings.

Preferably, the shaft comprises a tool shaft to which a drilling tool is connected, although the shaft could instead comprise a gear shaft carrying a plurality of gears. A tool shaft and gear shaft could be provided together, with the gaps thereof arranged in series in the lubricant conduit.

The helical thread is preferably arranged to conduct lubricant in an upward direction through the gap so that any heating of the lubricant which occurs will assist in propelling the lubricant through the gap.

Preferably, the helical thread is disposed on the surface of the shaft, although it could be disposed on the surface of the stationary member if desired.

BRIEF DESCRIPTION OF THE DRAWINGS

The objects and advantages of the invention will become apparent from the following detailed description of a preferred embodiment thereof in connection with the accompanying drawings, in which like numerals designate like elements, and in which:

FIG. 1 is a vertical sectional view taken through a shaft assembly according to the present invention;

FIG. 2 is an enlarged fragmentary view of the tool shaft depicting a helical thread formed on an outer annular surface thereof; and FIG. 3 is an enlarged fragmentary view of the gear shaft and stationary rod, depicting the helical thread formed on the outer annular surface of the stationary rod.

DETAILED DESCRIPTION OF A PREFERRED EMBODIMENT OF THE INVENTION

A vertical shaft arrangement 10 according to the present invention comprises a housing 12 on which one or more vertical tool shafts 14 are mounted. A suitable tool such as a drilling tool 16 is mounted to the tool shaft 14 so as to be rotatable with the tool shaft about a vertical axis.

The tool shaft 14 is rotatably mounted by vertically spaced upper and lower bearings 18, 20 disposed between the tool shaft and the housing. For example, a lower bearing 18 may comprise one or more ball bearing assemblies having ball-shaped rotary elements spaced circumferentially around the shaft 14 and the upper bearing 20 may comprise a roller bearing assembly having cylinder-shaped rotary elements spaced circumferentially around the shaft 14. A segment of the tool shaft extending from the upper to the lower bearing assembly is substantially longer than the outer diameter of the tool shaft and also substantially longer than the combined lengths of segments of the tool shaft extending within the bearing assemblies. The length of that shaft segment should be at least four times the diameter.

The tool shaft 14 is coaxially received in a sleeve 22 which is affixed stationarily to the housing. The shaft 14 comprises an inner rod 24 and a sleeve 26 rigidly affixed thereon, e.g., by a heat shrink securement. The stationary sleeve 22 constitutes an outer sleeve and the rotary sleeve 26 constitutes an inner sleeve. Alternatively, the rod could be provided with an integral portion of enlarged diameter instead of the sleeve 26.

A vertical channel 30 is established by a radial gap between the shaft 14 and the housing 12, i.e., by a radial gap between the outer periphery of the inner sleeve 26 and an inner periphery of the outer sleeve 22. The length of the gap extending between the bearings 18, 20 is longer than the gap width, i.e., the width defined by the difference between the outer and inner gap radii. The gap is preferably no greater than 0.005 inches. The tool shaft channel 30 has an inlet 32 at the lower bearing assembly and an outlet 34 at the upper bearing assembly, whereby the lower bearing assembly defines an upstream bearing assembly and the upper bearing assembly defines a downstream bearing assembly.

The tool shaft carries a driven gear 36 at its upper end which meshes with a drive gear 38. The drive gear 38 is mounted on a hollow gear shaft 40 which is rotatable about a vertical axis. A gear 42 disposed at an upper end of the gear shaft meshes with a gear 44 that is driven by an outlet shaft 46 of a motor 48 mounted on the housing. Thus, the motor 48 drives the tool shaft 14 via the gears 44, 42, 38, 36.

The gear shaft 40 rotates around an internal coaxial stationary rod 50, and rotates within a pair of vertically spaced bearings 52, 54 and an intermediate bearing 55 disposed between the gear shaft 40 and the housing 12. A segment of the gear shaft extending between successively disposed ones of the bearings 52, 54, 55 is substantially longer than the outer diameter of the gear shaft, e.g., preferably at least four times as long, and also is substantially longer than the combined lengths of segments of the gear shaft disposed within the successively disposed bearings. Disposed between an inner periphery of the gear shaft 40 and an outer periphery of the stationary rod is a vertical annular gear shaft channel 56. The channel 56 is defined by a radial gap (e.g., no greater than 0.005 inches) between the gear shaft and the stationary rod. The length of the gap 56 between successive ones of the bearings is greater than the gap width.

A lower inlet 58 of the channel 56 communicates with the outlet 34 of the channel 30 by way of an inlet chamber 62 in the housing. The gear shaft lower bearing 52 lies within that inlet chamber 62.

Affixed to an upper end of the stationary rod 50 is an end plate 64 which forms an outlet chamber 66 in which the gear shaft upper bearing 54 lies.

Disposed within the housing 12 is a reservoir 70 which contains a supply of oil lubricant 72. A lower portion of the reservoir 70 communicates with the inlet 32 of the channel 30 by means of a lubricant supply passage 74. Lubricant from the lubricant outlet chamber 66 is returned to an upper portion of the reservoir by means of a lubricant return line 76.

In accordance with the present invention, lubricant is circulated vertically through the tool shaft channel 30 by a helical thread 80 (see FIG. 2) formed on the outer periphery of the sleeve 26 of the rotary tool shaft 14. The height or width of the channel 30, i.e., the channel dimension in the radial direction is significantly less than the length of the channel extending between the upper and lower bearings and is, in fact, only slightly wider than the height of the thread 80. The helical thread 80 is configured so as to induce an upward movement of lubricant through the channel 30 in response to rotation of the tool shaft 14. Thus, lubricant is supplied to the lower and upper bearing assemblies 18, 20 by means of a lubricant conduit defined by the channel 30 and the inlet 32 and outlet 34. Importantly, the tool shaft channel 30 will contain a continuously flowing lubricant, the flow being at relatively high speed since the tool shaft is rotating at least at 500 rpm. Consequently, the lubricant functions as a hydrostatic bearing for the segment of the tool shaft disposed between the upper and lower bearing assemblies stabilize the stabilizes the tool shaft 14 in a manner effectively resisting vibration thereof, even if that segment of the tool shaft is not perfectly symmetrical about its axis of rotation.

Moreover, the flowing lubricant functions to cool the tool shaft 14 by absorbing heat therefrom. That action aids in effecting a vertical (upward) circulation of the lubricant through the tool shaft housing, because as the lubricant becomes heated, it tends to rise within the channel 30. Such thermally induced rising of the lubricant promotes the upward travel of the lubricant within the channel.

Instead of being formed on the rotary tool shaft 14, the helical thread 80 could be formed on the stationary sleeve 22. Such an arrangement wherein the helical thread is stationary, is provided in connection with the stationary gear shaft 50. That is, after the lubricant exits the tool shaft channel 30, it is circulated upwardly within the gear shaft channel 56 by means of a helical thread 82 formed on the stationary inner rod 50. The height or width of the channel 56, i.e., the channel dimension in the radial direction, is significantly less than the length of the channel 56 extending between the upstream and downstream bearings 52, 54 and is, in fact, only slightly wider than the height of the thread 82. Since the channel 56 is relatively narrow, friction occurring between the inner periphery of the gear shaft 40 and the lubricant causes the lubricant within the channel to be rotated along with the gear shaft 40 at relatively high speed, e.g., the gear shaft rotating at least 500 rpm. Due to the presence of the helical thread 82 in the gear shaft channel 56, the rotating lubricant is caused to be displaced vertically within the channel and through the outlet chamber 66 and back to the reservoir 70. Consequently, the upper and lower bearings 54, 52 become lubricated, and a hydrostatic bearing is created which stabilizes the gear shaft in a manner similar to the lubricant flowing in the tool shaft channel 30. The upward flow of the lubricant within the gear shaft channel 56 is aided by the thermally induced convection of the lubricant as it is heated, in the same manner as the lubricant traveling through the tool shaft channel 30.

It will be appreciated that instead of providing the helical thread 82 on the outer periphery of the stationary rod 50, it could be provided on the inner periphery of the rotary gear shaft 40 so as to function in a manner similar to the helical thread 80 formed on the rotary tool shaft 14.

It will also be appreciated that various configurations of the lubricant-conducting passages are possible, it being merely necessary that the lubricant pass through the lubricant channels and the bearings. Furthermore, any suitable number of tool shaft/gear shaft assemblies can be provided on the housing and supplied with lubricant from the reservoir. Some or all of those assemblies could be connected whereby the lubricant passes therethrough in series.

In accordance with the present invention, problems associated with the vibration of high speed shafts are alleviated by the hydrostatic bearing which is created. Furthermore, the cost and maintenance problems and the heating of lubricant associated with the provision of a pump are eliminated. These advantages are achieved by means of a highly simplified and inexpensive arrangement.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus comprising a stationary member, a shaft mounted for rotation relative to said stationary member about a vertical axis, a drilling tool connected to said shaft, vertically spaced bearings supporting said shaft for rotation about said axis, a segment of said shaft extending between said bearings being substantially longer than an outer diameter of said shaft, a gap formed radially between opposing annular surfaces of said shaft and said stationary member, a length of said gap extending between said bearings being substantially greater than a width of said gap, a lubricant inlet communicating with said gap adjacent one vertical end thereof, a lubricant outlet communicating with said gap adjacent an opposite vertical end thereof, said gap and said lubricant inlet and outlet defining portions of a lubricant conduit means, said bearings lying in said lubricant conduit means, a reservoir having an outlet communicating with said lubricant inlet, said reservoir containing a supply of lubricant oil, drive means operably connected to said shaft for rotating said shaft at least at 500 rpm, one of said opposing annular surfaces including helical thread means for inducing a vertical flow of lubricant oil through said conduit means for lubricating said bearings and creating hydrostatic support for said segment of said shaft extending between said bearings, said vertically spaced bearings including an upstream bearing disposed adjacent said lubricant inlet, and a downstream bearing disposed adjacent said lubricant outlet, said upstream and downstream bearings being so arranged in said conduit means that all of said lubricant traveling through said conduit means flows through said upstream and downstream bearings.

2. Apparatus according to claim 1, wherein said helical thread is arranged to conduct lubricant in an upward direction through said gap.

3. Apparatus according to claim 1, wherein said helical thread is disposed on said annular surface of said shaft.

4. Apparatus according to claim 3, wherein said annular surface of said shaft constitutes an outer peripheral surface thereof.

5. Apparatus according to claim 1, wherein said helical thread is disposed on said annular surface of said stationary member.

6. Apparatus according to claim 5, wherein said annular surface of said stationary member constitutes an outer peripheral surface thereof.

7. Apparatus comprising a first stationary member, a first shaft mounted for rotation relative to said first stationary member about a vertical first axis, vertically spaced first bearings supporting said first shaft for rotation about said first axis, a segment of said first shaft extending between said upper and lower first bearings being substantially longer than an outer diameter of said first shaft, a first gap formed radially between opposing annular first surfaces of said first shaft and said first stationary member, a length of said first gap extending between said first bearings being substantially greater than a width of said first gap, a first lubricant inlet communicating with said first gap adjacent one vertical end thereof, a first lubricant outlet communicating with said first gap adjacent an opposite vertical end thereof, said first gap and said first lubricant inlet and outlet defining portions of a first lubricant conduit means, said first bearings lying in said first lubricant conduit means, a reservoir having an outlet communicating with said first lubricant inlet and containing a supply of lubricant oil, a drilling tool and a first gear mounted on said first shaft, a second stationary member, a second shaft mounted for rotation relative to said second stationary member about a vertical second axis, vertically spaced second bearings supporting said second shaft for rotation about said second axis, a segment of said second shaft extending between said second bearings being substantially longer than the outer diameter of said second shaft, a second gap formed radially between opposing annular second surfaces of said second shaft and said second stationary member, a length of said second gap extending between said second bearings being substantially greater than a width of said second gap, a second lubricant inlet communicating with said second gap adjacent one vertical end thereof, a second lubricant outlet communicating with said second gap adjacent an opposite vertical end thereof, said second gap and said second lubricant inlet and outlet defining portions of a second lubricant conduit means, said first lubricant outlet communicating with said second lubricant inlet for conducting all of said lubricant oil from said first lubricant conduit means to said second lubricant conduit means, said second bearings lying in said second lubricant conduit means, second and third gears mounted on said second shaft, said second gear meshing with said first gear, a motor operably connected to said third gear for rotating said second and first shafts at least at 500 rpm, one of said opposing first surfaces including a first helical thread, one of said opposing second surfaces including a second helical thread, said first and second threads inducing a flow of lubricant oil through said first and second lubricant conduit means for lubricating said first and second bearings and for creating hydrostatic support for said segment of said first shaft extending between said first bearings and for said segment of said second shaft extending between said second bearings, said first bearings including a first upstream bearing disposed adjacent said first lubricant inlet, and a first downstream bearing disposed adjacent said first lubricant outlet, said first upstream and downstream bearings being so arranged in said first conduit means that all of said lubricant traveling through said first conduit means flows through said first upstream and downstream bearings, said second bearings including a second upstream bearing disposed adjacent said second lubricant inlet, and a second downstream bearing disposed adjacent said second lubricant outlet, said second upstream and downstream bearings being so arranged in said second conduit means that all of said lubricant traveling though said second conduit means flows through said second upstream and downstream bearings.

8. Apparatus according to claim 7, wherein said first and second threads are arranged to circulate lubricant oil upwardly through said first and second gaps.

9. Apparatus according to claim 8, wherein said first thread is disposed on said first shaft and said second thread is disposed on said second stationary member.

10. Apparatus according to claim 7, wherein said first thread is disposed on said first shaft and said second thread is disposed on said second stationary member.

11. Apparatus according to claim 1, wherein each of said bearings includes rotary elements spaced circumferentially around said shaft, said lubricant traveling between said rotary elements.

12. Apparatus according to claim 7, wherein each of said first and second bearings includes rotary elements spaced circumferentially around respective ones of said first and second shafts, said lubricant traveling between said rotary elements.

* * * * *